UNITED STATES PATENT OFFICE.

MARK MUSGRAVE AND HENRY J. BARTON, OF OAK BAR, CALIFORNIA.

OINTMENT.

SPECIFICATION forming part of Letters Patent No. 334,539, dated January 19, 1886.

Application filed October 27, 1885. Serial No. 181,108. (No specimens.)

*To all whom it may concern:*

Be it known that we, MARK MUSGRAVE and HENRY J. BARTON, of Oak Bar, in the county of Siskiyou, and State of California, have invented an Improvement in Ointments; and we hereby declare the following to be a full, clear, and exact description thereof.

Our invention relates to the class of ointments for healing purposes; and our invention consists in the composition of matter made of the following ingredients, combined substantially in the proportions stated, viz: Leaves of the manzanita, (*Arctostaphylos pungens*,) twelve and one-half parts; oxide of lead, fifty parts; olive-oil, twenty-five parts; vinegar, twelve and one-half parts. These are compounded in the following manner: Take three parts, approximately, of the vinegar and boil the oxide of lead in it. In the remainder of the vinegar boil the manzanita-leaves. Then mix the resultants of the two boilings together, and allow the mixture to become cold, after which drain off the liquid. Then add the olive-oil and mix the whole well together.

The general use of the composition is as an ointment, being good for healing chronic or old and mortified wounds, ulcerated and gangrene sores, proud flesh, burns, scalds, and wounds or bruises of any kind. It is applied by spreading it on a clean linen rag, which is then placed over the part to be healed. As often as the ointment is absorbed apply fresh ointment on a fresh cloth. The ointment is self-cleansing, and water should not be used.

The manzanita is a tree or shrub growing on the Pacific coast, both in California and Mexico. It has peculiarly astringent properties, and its leaves act in our composition as an astringent, being cooling, drying, and serving to allay inflammation. The oxide of lead is healing, and destroys the venom and mortification. The olive-oil keeps the wound soft while healing. The vinegar is used to extract the virtue from the manzanita-leaves and unite with the oxide of lead.

We are aware acetate of lead has been used as an ointment and that manzanita has been employed as a topical remedy or salve, and these ingredients we do not claim broadly as our invention.

Having thus described our invention, what we claim as new, and desire to secure by Letters Patent, is—

An ointment consisting of manzanita-leaves, (*Arctostaphylos pungens*,) oxide of lead, olive-oil, and vinegar, in the proportions substantially as stated.

In witness whereof we have hereunto set our hands.

MARK MUSGRAVE.
HENRY J. BARTON.

Witnesses:
J. W. BRADLEY,
JOSEPH RICE.